United States Patent Office 3,256,143
Patented June 14, 1966

3,256,143
CONTROLLING GRAM NEGATIVE BACTERIA WITH n-PROPYL TEN HALIDES AND OXIDES
Robert J. Zedler, White Plains, N.Y., assignor, by mesne assignments, to M & T Chemicals Inc., New York, N.Y., a corporation of Delaware
No Drawing. Filed Nov. 6, 1961, Ser. No. 150,171
6 Claims. (Cl. 167—22)

This invention relates to a method for controlling gram negative bacteria and for protecting materials against their attack.

Gram negative bacteria may be expected to grow wherever the proper combination of conditions and nutrients for the development of microorganisms exists. Commonly, gram negative bacteria may coexist with other microorganisms, such as gram positive bacteria, molds, etc. Where the growth of these organisms is not controlled, serious problems of odor, deterioration of materials, health hazards, etc., may be present. When these organisms develop in process waters which may contain nutrients, they may form bacterial growths which cause processing difficulties. Such growths may clog pipes, filters, orifices, etc., interfere with proper operation of heat exchangers, or cooling towers, or may contribute to the formation of an unsatisfactory product.

In the past, no completely satisfactory method for controlling gram negative bacteria has been found. Among the agents which have been tried against these organisms may be noted the mercurials, the quaternaries, and the phenols. None of these is free from serious defects which render it unsuitable for use in a wide variety of applications. The mercurials are characterized by their extreme mammalian toxicity, both internal and dermal. The quaternaries may not be used in areas wherein certain salts are present, since they may react with anions to form insoluble and inactive percipitates. Phenol and phenol derivatives are highly toxic chemicals and may cause serious odor problems.

Other materials have been found which may adequately control the growth of molds and gram positive bacteria, but are ineffective against gram negative bacteria. The use of such materials in systems wherein gram negative bacteria are present has not provided a complete solution to the problems associated with the growth to microorganisms. When several types of organisms, including gram negative bacteria, are simultaneously present it may readily be possible to inhibit growth of organisms other than the gram negative bacteria; however elimination from the system of these other organisms permits a rapid increase in the population of the gram negative bacteria and the total bacterial count may remain at the same or a higher level than before treatment. Accordingly, it has not heretofore been possible to effect completely satisfactory control of microorganisms in systems wherein gram negative bacteria are present.

It is an object of this invention to provide a method for controlling the growth of gram negative bacteria. Another object of this invention is to provide a bacteriostatic agent which is effective against gram negative bacteria. A further object of this invention is to provide a method for controlling the growth of a broad spectrum of microorganisms. Other objects will be apparent to those skilled in the art on inspection of the following description.

In accordance with certain of its aspects, the method of this invention for controlling the growth of gram negative bacteria comprises applying to the locus at which such control is desired, a bacteriostatic amount of an organotin compound of the formula $R_3SnX$ wherein R is a hydrocarbon radical selected from the class consisting of the ethyl, n-propyl, isopropyl, allyl, and vinyl radicals; and X is an inorganic radical selected from the class consisting of oxygen, sulfur, and halogens.

In accordance with certain aspects of this invention, the compound $R_3SnX$ may contain R groups wherein R is selected from the class consisting of ethyl, n-propyl, isopropyl, allyl, and vinyl. Preferably all the R groups in a compound may be the same. The $R_3Sn$-radical may preferably be, for example, the triethyltin radical, the tri-n-propyltin radical, the trivinyltin radical, the triallyltin radical, and the triisopropyltin radical.

The radical X in the compound $R_3SnX$ may be selected from the class consisting of oxygen, sulfur, and halogens. X may typically be oxygen, sulfur, bromine, chlorine, iodine or fluorine. It will be understood by those skilled in the art that when X is divalent, e.g., oxygen or sulfur, the formula $R_3SnX$ becomes $(R_3Sn)_2X$.

Illustrative of the compounds which may be employed either alone or in admixture in practice of this invention may be noted:

(a) Triethyltin chloride, triethyltin bromide, triethyltin iodide, triethyltin fluoride, bis(triethyltin)oxide, bis(triethyltin)sulfide;

(b) Tri-n-propyltin chloride, tri-n-propyltin bromide, tri-n-propyltin iodide, tri-n-propyltin fluoride, bis(tri-n-propyltin)oxide, bis(tri-n-propyltin)sulfide;

(c) Tri-isopropyltin chloride, tri-isopropyltin bromide, tri-isopropyltin iodide, tri-isopropyltin fluoride, bis(tri-isopropyltin)oxide, bis(tri-isopropyltin)sulfide;

(d) Trivinyltin chloride, trivinyltin bromide, trivinyltin iodide, trivinyltin fluoride, bis(trivinyltin)oxide, bis(trivinyltin)sulfide;

(e) Triallyltin chloride, triallyltin bromide, triallytin iodide, triallyltin fluoride, bis(triallyltin)oxide, bis(triallyltin)sulfide;

(f) Di-n-propylethyltin chloride, n-propylethylvinyltin bromide, bis(di-isopropylethyltin)oxide, bis(n-propyl, isopropyl, ethyltin)sulfide; diallyl, propyltin iodide, etc.

Mixtures of the above may also find use in specific embodiments of this invention.

Preferably R will be n-propyl, and the radical $R_3Sn$— will be the tri-n-propyltin radical. Preferably X will be oxygen or chlorine. $R_3SnX$ will preferably be bis(tri-n-propyltin oxide) and tri-n-propyltin chloride.

The bacteriostatic amount of organotin compound which may be employed in practice of this invention will be sufficient to substantially completely inhibit or kill gram negative bacteria in the locus to which the compound is applied. The desired level of inhibition may be obtained by utilizing the compounds in the manner herein disclosed in amount sufficient to form at the locus at which control is desired a concentation of compound of 0.005 to 300 pp. typically about 16–63 p.p.m. When it is desired to completely kill gram negative bacteria in a particular area, the preferred concentration may be 8 to 250, say 31 p.p.m. When it is preferred to sanitize an area, the preferred concentration may be 0.1 to 300, say 31 p.p.m. When the medium to be treated is a fluid medium typified by industrial process waters, the amount may be 0.005 to 2.0, say 0.75 p.p.m. In the case of textile treating techniques, it may be preferred to use the herein disclosed compounds in amounts sufficient to produce concentrations of 8 to 250, say 200 p.p.m.

Control of the growth of gram negative bacteria in accordance with this invention may be effected by applying the hereinbefore noted compounds in desired manner to the locus at which control of the gram negative bacteria is to be obtained. Although it may be possible to utilize these compounds in pure undiluted form, it is preferred to use them in the form of compositions containing inert diluent. The particular inert diluent which may be employed will be non-reactive with the hereinbefore noted compound and will not mask or otherwise decrease its bacteriostatic effect. The inert diluent which may be employed may vary upon the end use to which the technique is to be directed. The inert diluent may, for example, be a solid, typically silica, carbon black, limestone, slag (i.e., calcium silicate), or any of a wide variety of other solid materials, preferably in finely divided form. When solid inert material is used, the compound, which will normally be in liquid form, may be sprayed over the diluent, or otherwise intimately blended therewith. It may be possible to use a liquid inert diluent typical of which are those in which the compounds are readily soluble including for example mineral spirits, benzene, toluene, naphtha, butanol, etc., or those in which the compound may not be readily soluble, e.g., water. In the latter case, it may be preferred to employ an inert emulsifying or suspending agent to retain the compound in a dispersed form. Typical of such agents may be anionic, cationic, or nonionic surface active agents.

In this emulsifiable form, the amount of surface active agent may be the amount with which a stable emulsion is formed. Because of the large number of surface active agents which may find use in this invention, and their differing abilities to form stable emulsions, the amount of surface active agent employed will vary for different surface active agents. In general, the amount of surface active agent employed may be equal to or less than the amount of trialkyltin compound used.

In practice of this invention according to certain of its more specific aspects, it may be desirable to substantially completely kill or inhibit the growth of gram negative bacteria. When this is desired, as would be the case where an area is to be sanitized, the following procedure may be employed. An aqueous dispersion may be prepared containing the compound $R_3SnX$ in the concentration of 0.1 to 125 parts per million, preferably 0.5 to 35 parts per million, and said dispersion may be applied to the surface of the area or material to be sanitized. Typically, 0.0125 pound of bis(tri-n-propyltin) oxide may be dispersed in 5 gallons of water (30 p.p.m.) and the resulting solution sprayed, painted, sponged, etc., on the material to be sanitized.

Where the material to be treated is a continuous fluid medium, typified by industrial process waters, substantially complete elimination of problems caused by gram negative bacteria may be effected by dispersing in said fluid medium the $R_3SnX$ at a concentration of the order of 0.005 to 2.0 parts per million, based on the weight of the fluid medium. Preferably, the concentration of $R_3SnX$ in the fluid medium will be 0.05 to 1.0, say 0.75 part per million. For example, where the process in which control of gram negative bacteria is desired utilizes process water in the amount of 500,000 gallons, it may be found that the addition 0.3 pound of tri-n-propyltin chloride (0.72 part per million) will substantially eliminate the problems attributable to gram negative bacteria and various other organisms.

It may also be desired to use the compounds of the instant invention as textile finishes. When so employed, these compounds may render the treated textile materials permanently resistant to attack by gram negative bacteria and other organisms, and may prevent the development of objectionable odors on the treated material. Typically, such treatment may be effected by applying to the textile material an amount of a dispersion of the compound $R_3SnX$ such that the concentration of $R_3SnX$ on the treated textile material is of the order of 16 to 200, say 200 parts per million. This application may be accomplished by any of the methods known to the art, such as padding, spraying, brushing, etc. Alternatively, textile materials may be treated with compound $R_3SnX$, and the resulting advantages enjoyed, by incorporating into the formulation of soap or detergent, with which the materials are washed, a suitable amount of compound $R_3SnX$. Typically $R_3SnX$ may be present in an amount of the order of 0.5% of the soap or detergent formulation.

In practice of certain aspects of this invention, it will be found that the solubility of $R_3SnX$ in the medium to be treated is sufficiently high so that a solution is formed. In practice of certain other aspects, it may be found that the solubility is not great enough to obtain the desired concentration, and it may be desirable to use the compound $R_3SnX$ in an emulsifiable or solubilized form. The emulsifiable form may be a solution of $R_3SnX$ in a suitable solvent, say mineral spirits or naphtha in which is incorporated a suitable surface active agent. Typically, an emulsifiable composition may contain 30-90 parts of the compound $R_3SnX$, say bis(tri-n-propyltin)oxide, 4-20 parts of a surface active agent, say an alkylarylpolyether alcohol and 2-75 parts of inert solvent, say naphtha. In all cases, the surface active agent will be present in an amount substantially equal to or less than the amount of $R_3SnX$. It is a feature of this formulation that it readily forms an emulsion when dispersed in water. The solubilized form may be composition containing $R_3SnX$ and a surface active agent, the latter being present in an amount of about 2-5 times the amount of the former, and one inert diluent. Typically, a solubilized composition may contain 2-30 parts of the compound $R_3SnX$, say bis(tri-n-propyltin)oxide, 10-75 parts of a surface active agent, say an alkylarylpolyether alcohol, and 9-70 parts of an inert solvent, say water. In all cases, the surface active agent will be present in the amount of about 2-5 times the amount of $R_3SnX$. When this formulation is added to water, a dispersion is formed which has the superficial appearance of a true solution. The surface active agents which may be employed in these formulations may typically be selected from the classes of anionic surface active agents typified by sodium lauryl sulfate; nonionic surface active agents typified by the reaction product of 9 moles of ethylene oxide with one mole of nonyl phenol; and cationic surface active agents typified by stearyl dimethyl benzyl ammonium chloride. Other equivalent surface active agents well known to those skilled in the art may be used.

It is an advantage of this invention that, when practiced as herein set forth, it will provide a method for controlling the growth of gram negative bacteria and other microorganisms commonly found in coexistence with them.

In each of Examples 1–19, tests were conducted to determine the activity against the noted microorganisms of the compositions of this invention. In each example, a series of tests was carried out when the composition was placed within a nutrient agar broth in amount of 500, 250, 125, 63, 31, 16, 8, 4, 2, 1, 0.5, 0.25, and 0.125 parts per million. Each broth was inoculated with the test organism and the broth was incubated at 37° C. for two days. The organism growth was visually observed. The broth containing the minimum concentration of the composition which caused complete inhibition of the growth of the organism was noted and is tabulated below in the table.

In Examples 1–8, the noted compounds were tested against *Pseudomonas aeruginosa*, a gram negative bacteria.

| Example | Agent | P.p.m. for inhibition |
| --- | --- | --- |
| 1 | Triphenyltin chloride (standard) | ¹ 500 |
| 2 | Bis(tri-n-butyltin)oxide (standard) | ¹ 500 |
| 3 | Tri-n-octyltin bromide (standard) | ¹ 500 |
| 4 | Triethyltin chloride | 16 |
| 5 | Trivinyltin chloride | 63 |
| 6 | Tri-n-propyltin chloride | 31 |
| 7 | Bis(tri-n-propyltin)oxide | 31 |
| 8 | Bis(tri-isopropyltin)oxide | 125 |

¹ Incomplete inhibition at these levels.

In Examples 9–15 the noted compounds were tested against *Aerobacter aerogenes*, a gram negative bacteria.

| Example | Agent | P.p.m. for inhibition |
| --- | --- | --- |
| 9 | Bis(tri-n-butyltin)oxide (standard) | [1]500 |
| 10 | Tri-n-octyltin bromide (standard) | [1]500 |
| 11 | Triethyltin chloride | 16 |
| 12 | Trivinyltin chloride | 63 |
| 13 | Tri-n-propyltin chloride | 16 |
| 14 | Bis(tri-n-propyltin)oxide | 16 |
| 15 | Bis(tri-isopropyltin)oxide | 125 |

[1] Incomplete inhibition at these levels.

In Examples 16–19 the noted compounds were tested against the fungi *Penicillium funiculosum* and *Aspergillus flavus*, and the fungus-yeast *Candida albicans*.

| Example | Agent | Pen. Fun. | Asp. Flav. | Can. Alb. |
| --- | --- | --- | --- | --- |
| 16 | Trimethyltin chloride (standard) | [1]500 | [1]500 | [1]500 |
| 17 | Triethyltin chloride | 16 | 16 | <1.0 |
| 18 | Bis(tri-n-propyltin)oxide | 1.0 | 0.125 | 0.5 |
| 19 | Bis(tri-isopropyltin)oxide | 2.0 | <1.0 | <1.0 |

[1] Incomplete inhibition at these levels.

The compounds noted in Examples 20 and 21 infra, were tested against *Xanthamonas vesicatoria*, a gram negative bacteria, by the agar plate method, and against *Alternaria aleraceae*, a mold, by the slide germination test.

The agar plate method may be described as follows:

A ten percent solution of the compound in acetone was made. This solution was diluted with tap water to give solutions of 1, 0.1, 0.01, 0.001, etc., percent. One milliliter of each solution was mixed with nine milliliters of nutrient agar, and the mixture allowed to harden. When the agar was solid, it was streaked with the desired organism and incubated at 22° C. for one week. The numbers reporteed were the minimum concentrations of the compound, in parts per million based on the weight of the mixture, required to completely inhibit the growth of the organism.

In the slide germination test, a 0.001 percent solution of the compound in acetone was made. This was diluted with tap water to give solutions of 0.0001, 0.00001, etc. percent. A standard volume of the test solution was mixed with a standard amount of a spore suspension of the testing organism. Drops of this mixture were placed on microscope slides and incubated at 22° C. for 24 hours in a moist chamber. The values reported are the concentrations of the agents, in parts per million of solution, which were required to completely inhibit the growth of the spores.

| Example | Agent | X. ves. | Alt. aler. |
| --- | --- | --- | --- |
| 20 | Triethyltin chloride | 100 | 10 |
| 21 | Triethyltin acetate (standard) | [1]1,000 | 100 |

[1] Incomplete inhibition at this level.

It will be noted from the data of Examples 1–8 that only those members of the class of compounds represented by the formula $R_3SnX$ in which R is selected from the class consisting of ethyl, vinyl, n-propyl and isopropyl possess unexpected activity against the noted gram negative bacteria. The standard compounds of Examples 1 and 2 are chemicals which have been disclosed in the prior art as broad spectrum biological control agents. It is apparent that practice of this invention permits attainment of results which may be as much as about twenty times superior to prior art techniques. The data from Examples 9–15 (including standard Examples 9 and 10), also point up the unexpected activity against gram negative bacteria possessed by the compounds of this invention. Inhibition is shown to be attainable with amounts as low as about 5% of that required for the control materials.

Examples 16–19 are illustrative of the broad spectrum of activity of the compounds of the instant disclosure, not possessed by other members of the homologous series, e.g., trimethyltin chloride. As noted, the technique of this invention permits inhibition to be attained with amounts as low as 0.2% of the amount of standard material. It is this broad spectrum of activity which permits control of a large number of microorganisms by the method of this invention, particularly where the microorganisms are gram negative bacteria and those organisms normally found in coexistence with them.

As illustrated by Examples 20 and 21 (standard), the nature of the group X effects the inhibitory activity of the compound $R_3SnX$. The compounds of the instant disclosure, in which X is selected from the class consisting of oxygen, sulfur, and halogens, may be characterized by their ability to control the growth of gram negative bacteria and other microorganisms at very low levels of concentration. It is this unique combination of effectiveness and efficiency which renders the compounds of this invention highly useful as bacteriostats, sanitizing agents, preservatives, etc.

While the invention has been illustrated by reference to certain of its specific embodiments, it is not meant to be limited thereby, and should be restricted only by the scope of the appended claims.

I claim:

1. A method for controlling the growth of gram negative bacteria which comprises applying to the locus at which control is desired a bacteriostatic amount of an organotin compound of the formula $R_3SnX$ wherein R is n-propyl and X is an inorganic radical selected from the group consisting of oxygen and halogen.

2. A method for controlling the growth of gram negative bacteria as claimed in claim 1 wherein $R_3SnX$ is tri-n-propyltin chloride.

3. A method for controlling the growth of gram negative bacteria as claimed in claim 1 wherein $R_3SnX$ is tri-n-propyltin iodide.

4. A method for controlling the growth of gram negative bacteria as claimed in claim 1 wherein $R_3SnX$ is tri-n-propyltin bromide.

5. A method for controlling the growth of gram negative bacteria as claimed in claim 1 wherein $R_3SnX$ is tri-n-propyltin fluoride.

6. A method for controlling the growth of gram negative bacteria as claimed in claim 1 wherein $R_3SnX$ is bis(tri-n-propyltin) oxide.

References Cited by the Examiner

UNITED STATES PATENTS

| | | | |
| --- | --- | --- | --- |
| 1,744,633 | 1/1930 | Hartman et al. | 167—22 |
| 2,915,428 | 12/1959 | Weinberg | 162—161 |
| 2,965,661 | 12/1960 | Ramsden | 260—429.7 |
| 3,097,999 | 7/1963 | Koopmans | 167—225 |

FOREIGN PATENTS

| | | |
| --- | --- | --- |
| 806,535 | 12/1958 | Great Britain. |
| 838,722 | 6/1960 | Great Britain. |
| 129,325 | 1/1960 | Russia. |

OTHER REFERENCES

Chemicals Abstracts, vol. 54, p. 12472g (1960), abstract of U.S.S.R. Patent 125,325.

Hueck et al., J.S.D.C., June 1958, 476–480.

JULIAN S. LEVITT, *Primary Examiner.*

FRANK CACCIAPAGLIA, JR., *Examiner.*